(12) United States Patent
MacDougall et al.

(10) Patent No.: US 7,560,685 B2
(45) Date of Patent: Jul. 14, 2009

(54) SPECTRALLY STABILIZED BROADBAND OPTICAL SOURCE

(75) Inventors: Trevor MacDougall, Simsbury, CT (US); Domino Taverner, Farmington, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/855,292

(22) Filed: Sep. 14, 2007

(65) Prior Publication Data

US 2009/0072128 A1 Mar. 19, 2009

(51) Int. Cl.
*G01N 21/25* (2006.01)

(52) U.S. Cl. .............. 250/227.23; 250/227.14; 398/85

(58) Field of Classification Search ............ 250/227.23, 250/227.14; 398/85
See application file for complete search history.

(56) References Cited

U.S. PATENT DOCUMENTS

| 5,747,791 | A | 5/1998 | Coroy |
| 5,824,567 | A | 10/1998 | Shih et al. |
| 5,963,686 | A | 10/1999 | Zheng et al. |
| 6,097,487 | A | 8/2000 | Kringlebotn et al. |
| 2004/0240041 | A1 | 12/2004 | Tian et al. |
| 2005/0088660 | A1 | 4/2005 | Ronnekleiv |
| 2005/0134861 | A1 | 6/2005 | Kringlebotn et al. |
| 2005/0191008 | A1 | 9/2005 | Anson et al. |
| 2006/0076476 | A1 | 4/2006 | Thingbo et al. |
| 2007/0003285 | A1* | 1/2007 | Meyer et al. ............... 398/85 |
| 2007/0229838 | A1* | 10/2007 | Greening et al. ............ 356/460 |

FOREIGN PATENT DOCUMENTS

| DE | 2038 695 | 2/1972 |
| DE | 40 13 422 | 10/1991 |
| DE | 195 49 308 | 7/1997 |
| EP | 1 582 851 | 11/2007 |
| JP | 20 201220 | 11/1985 |
| WO | WO 87/02765 | 5/1987 |
| WO | WO 2008/101466 | 8/2008 |

OTHER PUBLICATIONS

GB Search Report from Application No. GB0816680.3 dated Jan. 6, 2009.

* cited by examiner

*Primary Examiner*—Seung C Sohn
(74) *Attorney, Agent, or Firm*—Patterson & Sheridan, LLP

(57) ABSTRACT

Methods and apparatus enable compensation of source light wavelength fluctuations due to instability of a broadband source within an optical sensing system. Tapping off two or more portions of the light output from the source at specific wavelength bands enables power based measurements of these portions. The measurements provide compensation ability by either use as feedback to control the source or for determination of the central wavelength so that adjustments can be applied to sensor response signals received at a receiver.

16 Claims, 5 Drawing Sheets

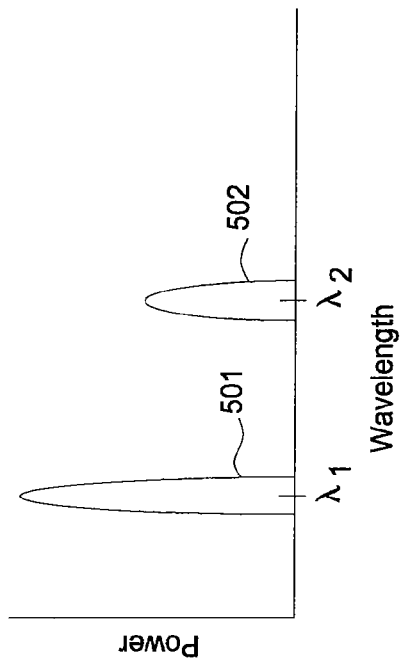
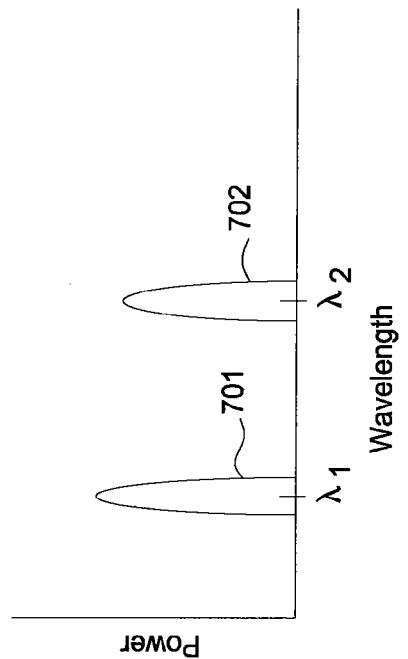
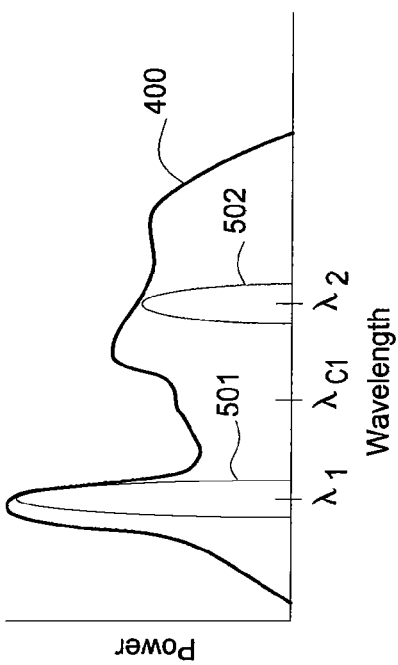
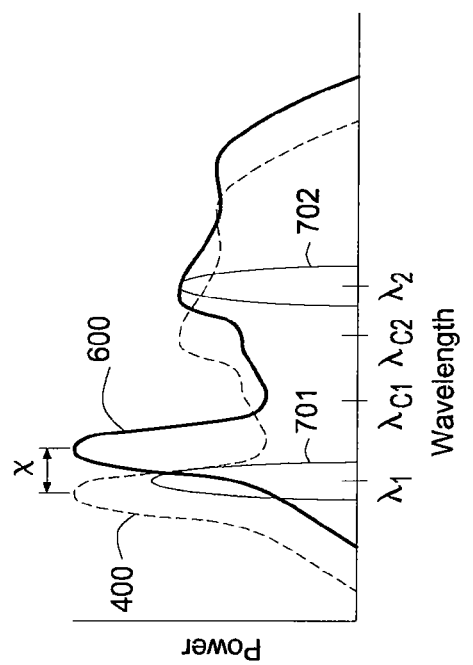
FIG. 4
FIG. 5
FIG. 6
FIG. 7

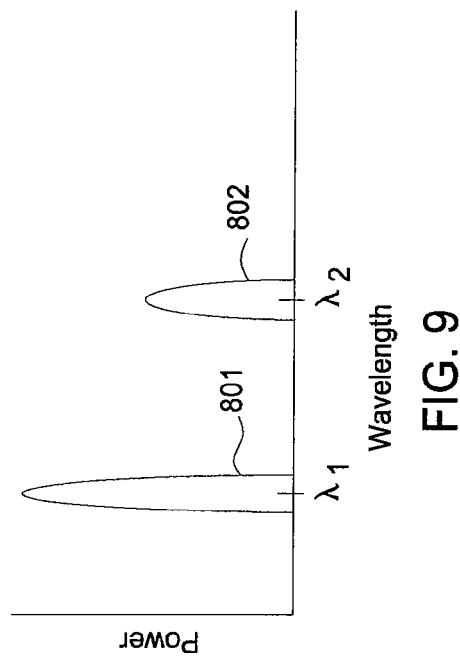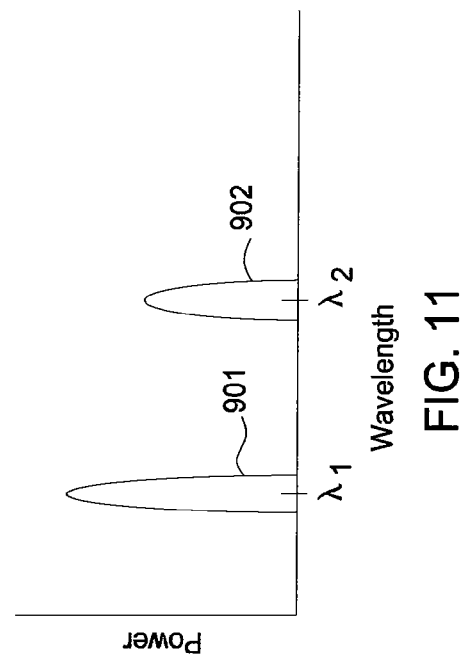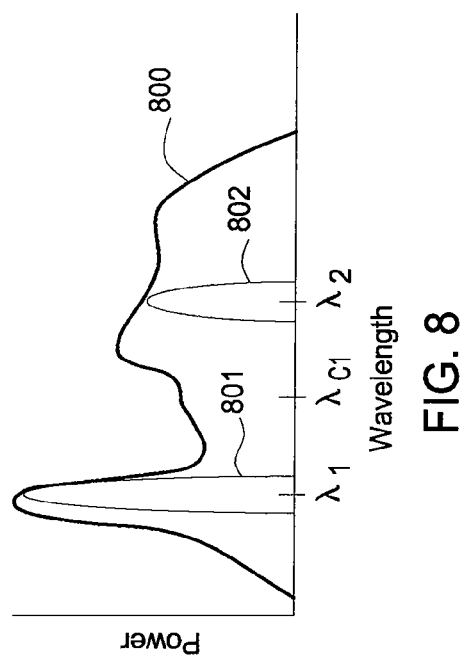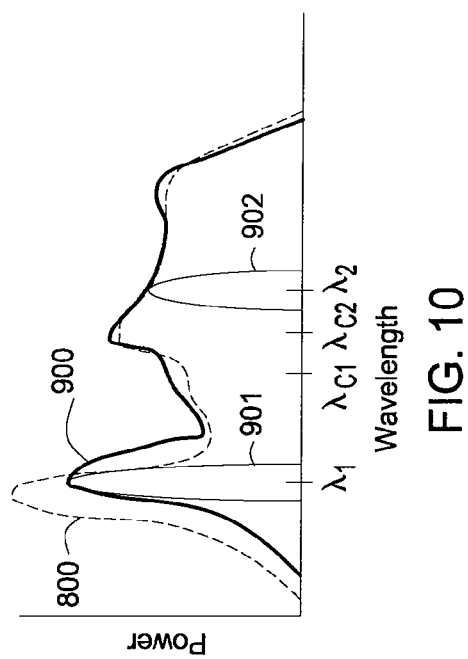

SPECTRALLY STABILIZED BROADBAND OPTICAL SOURCE

BACKGROUND OF THE INVENTION

1. Field of the Invention

Embodiments of the invention generally relate to optical sensing systems and, more particularly, to compensating for spectral fluctuations in broadband source light used to interrogate optical sensors.

2. Description of the Related Art

Most optical sensors include an optical fiber with a sensitized region exposed to an environmental condition. The sensitized region modulates an input or interrogating light signal transmitted within the optical fiber. This modulation can alter one or more parameters of the interrogating light transmitted within the optical fiber, such as amplitude, power distribution versus frequency/wavelength, phase or polarization. Analysis of modulated response light emerging from the fiber determines values indicative of the environmental condition. Such fiber-optic sensing techniques utilize sensors based on, for example, Bragg gratings or interferometers, to measure a wide variety of parameters, such as strain, displacement, velocity, acceleration, flow, corrosion, chemical composition, temperature or pressure.

As an example of these optical sensors, a Bragg grating sensor operates by modulating the wavelength of an input light field transmitted through an optical waveguide. The Bragg grating sensor comprises a tuned optical filter, or "Bragg grating," imprinted upon the core of an optical waveguide coupled to a broadband light source. The Bragg grating is structured to reflect light within a narrow bandwidth centered at a Bragg wavelength corresponding to the spacing of the Bragg grating. If the Bragg grating sensor is strained, for example by stress or vibration, the Bragg grating spacing changes. This change in spacing results in a shift in the reflected light wavelength, which can be measured and correlated with the magnitude of the stress or vibration.

Instabilities in a center wavelength of input light provided by a broadband light source may cause variations in sensor response signals produced upon the interrogating light arriving at the optical sensor. For example, broadband sources producing input light without a stable center wavelength when used with a Bragg grating sensor may cause variations in the reflected response signal emitted by the sensor, resulting in incorrect measurements or undesirable noise. Accurate and reliable measurements determined by detection of response signals from the optical sensors require a broadband light source outputting light with a center wavelength that does not drift around with time or other environmental changes. However, attempts in many environments to achieve such a stable broadband light source by stabilization and control (e.g., temperature stabilization or vibration dampening) of components proves difficult, expensive and oftentimes insufficient.

Therefore, there exists a need for improved optical sensing configurations and methods that compensate for center wavelength fluctuations in light produced by a broadband source used to interrogate optical sensors.

SUMMARY OF THE INVENTION

The invention generally relates to methods and apparatus that enable compensation of source light wavelength fluctuations due to instability of a broadband source within an optical sensing system. Tapping off two or more portions of the light output from the source at specific wavelength bands enables power based measurements of these portions. The measurements provide compensation ability by either use as feedback to control the source or for determination of the central wavelength so that adjustments can be applied to sensor response signals received at a receiver.

For some embodiments a sensor system includes a broadband light source for producing an optical spectrum defining interrogating light signals. A sensor element couples to the light source and is configured to provide response signals from the interrogating light signals. The sensor element couples to a receiver configured to detect and process the response signals. Further, a filter module includes a filtering device that taps off first and second portions of the optical spectrum at, respectively, first and second wavelength bands, wherein control circuitry compares intensity between the first and second portions to determine wavelength fluctuations of the optical spectrum.

According to some embodiments, a method of sensing a parameter includes producing a broadband optical spectrum defining interrogating light signals, interrogating a sensor element with the interrogating light signals to provide response signals, taping off first and second portions of the optical spectrum at, respectively, first and second wavelength bands, comparing intensity between the first and second portions to determine wavelength fluctuations of the optical spectrum, compensating for the wavelength fluctuations, and detecting and processing the response signals to determine the parameter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a graph of optical power verses wavelength for light output from the optical source used with the systems according to embodiments of the invention.

FIG. 5 is a graph illustrating a power reflected at two wavelength bands corresponding respectively with first and second gratings in the filter module that reflect the light output (shown in FIG. 4) from the optical source to provide a ratio based on the power.

FIG. 6 is a graph of optical power verses wavelength for the light output from the optical source illustrating a shift in center wavelength with respect to the light output depicted in FIG. 4.

FIG. 7 is a graph illustrating a power reflected at the two wavelength bands corresponding respectively with the first and second gratings in the filter module that reflect the light output (shown in FIG. 6) from the optical source to provide the ratio based on the power.

FIGS. 8-11 are analogous to graphs in FIGS. 4-7 except change in light output depicted by these graphs is more of a whole spectrum change in a pre-identified known manner than a universal signature shift.

DETAILED DESCRIPTION

Embodiments of the invention relate to sampling techniques which can constantly monitor a spectral output from a broadband source in order to incorporate measurements resulting from this monitoring into determination and/or control of a central wavelength of the source. For example, a Bragg grating or other filtering device can be used to monitor a portion of light tapped off an output from the source at specific wavelength bands. These signal taps provide measurements that can be used as feedback to directly control the central wavelength of the source or to aid in calculation and determination of the central wavelength so that adjustments can be applied to sensor response signals received at a receiver. In some embodiments, the sensor response signal may be from a fiber-optic gyroscope benefiting from the center wavelength shift monitored as discussed herein.

Figure 1:
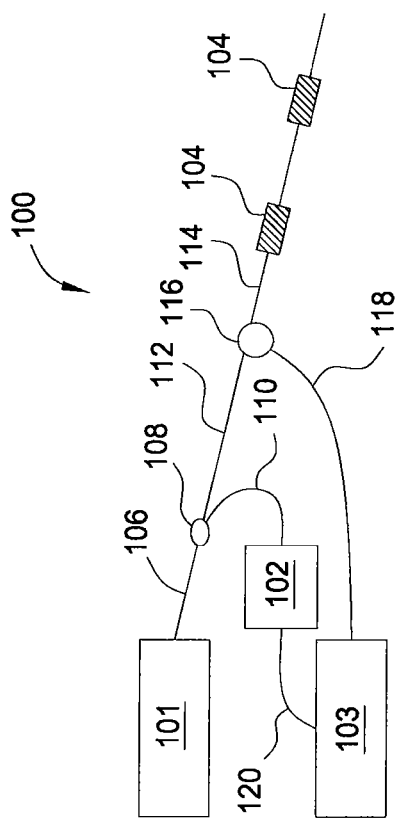
FIG. 1 is an optical sensing system, according to embodiments of the invention, with a tap from an optical source fed into a filter module that enables accounting for input light shifts at a receiver.

FIG. 1 shows an optical sensing system 100 including a broadband source 101, a filter module 102, a detector or receiver 103 and one or more sensor elements 104. When each of the sensor elements 104 include, for example, a fiber Bragg grating (FBG) or an interferometer which may form a fiber-optic gyroscope, using the broadband source 101 enables one or several reflected FBG sensor wavelengths to be measured by the receiver 103 provided the spectrum of the source 101 covers all possible FBG sensor wavelengths. These techniques for measuring FBG sensor wavelengths using the broadband source 101 make possible simultaneous wavelength demultiplexing and demodulation (wavelength determination) of the sensor elements 104. Examples of suitable forms of the broadband source 101 include an edge-light-emitting diode (ELED) or a rare earth doped superfluorescent fiber source (SFS).

In operation, input or interrogating light produced by the broadband source 101 travels through a primary optical fiber 106 to a splitter or tap 108 that splits the input light in two paths. For some embodiments, the entire spectrum of the input light from the source 101 passes through the tap 108 to the filter 102 along reference optical fiber 110 and to the sensor elements 104 via lead optical fiber 112 and sensing string 114. A coupler or circulator 116 directs response signals from the sensor elements 104 through return optical fiber 118 to the receiver 103.

As described in further detail with reference to FIGS. 3-12, the filter module 102 makes measurements of the input light that are intensity or power based in order to determine a center wavelength of the input light produced by the source 101. In other words, these power based signal measurements achieved with the filter module 102 enable determining with, for example, computer circuitry or logic any shift or drift of the light spectrum provided by the source 101 and utilized in interrogating the sensor elements 104. The filter module 102, for some embodiments, lacks reliance on any other optical parameter (e.g., wavelength or phase) measurements outside of taking signal amplitudes to assess optical power.

Compensating signals defining information regarding shifts in the center wavelength associated with the interrogating light spectrum travel from the filter module 102 to the receiver 103 through receiver compensating line 120. The receiver compensating line 120 provides a transmission pathway for the compensating signals that can be, for example, electrical or optical signals. The receiver 103, which can include signal processing hardware/software, accounts for the shift as determined with the filter module 102 by compensating response signals from the sensor elements 104 due to the shift. Shifts in the interrogating light spectrum caused by fluctuations in the source 101 induce known or computable variances in these response signals relative to a given interrogating light spectrum without any shift. For example, similar techniques used to determine the center wavelength as described herein can enable ascertaining effects of a particular shift on the response signals from each of the sensor elements 104. An algorithm applied to the response signals received from the sensor elements 104 can thereby compensate for the shifts in the light spectrum provided by the source 101 once the shift is determined by the filter module 102.

Figure 2:
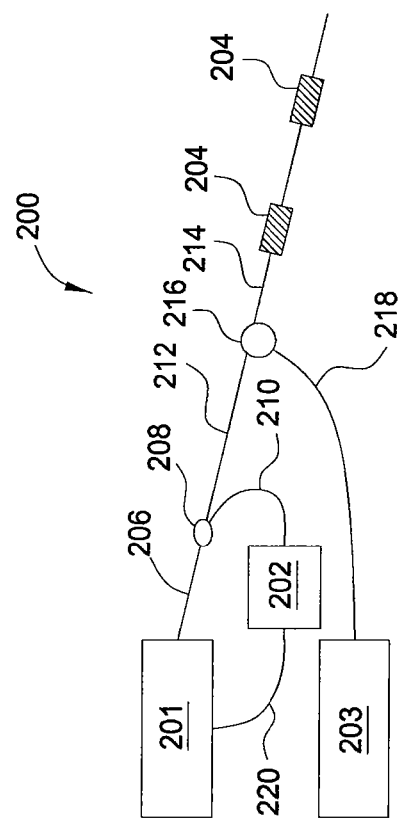
FIG. 2 is an optical sensing system, according to embodiments of the invention, with a tap from an optical source fed into a filter module that enables modifying characteristics of the optical source to maintain its stability.

FIG. 2 illustrates an optical sensing system 200 including a broadband source 201, a filter module 202, a receiver 203 and one or more sensor elements 204. Instead of compensating the response signals for fluctuations in the optical source 201, the filter module 202 enables modifying characteristics of the optical source 201 itself in order to maintain stability of the optical source 201 and hence the input light spectrum used to interrogate the sensor elements 204. As described below, feedback compensation line 220 provides compensating signals from the filter module 202 to the source 201 so that characteristics of the source 201 can be changed in order to reduce or eliminate drift in the center wavelength of the interrogating light spectrum.

Input light produced by the broadband source 201 travels through a primary optical fiber 206 to a tap 208 that splits the input light in two paths. The entire spectrum of the input light from the source 201 can pass through the tap 208 to the filter 202 and to the sensor elements 204 via respective fibers 210, 212, 214. A circulator 216 directs response signals from the sensor elements 204 through return optical fiber 218 to the receiver 203. Analysis of the response signals provides an accurate and reliable indication of parameters measured by the sensor elements 204 since the feedback feature of the system 200 keeps the interrogating light spectrum provided by the source 201 stable.

The filter module 202 (like the filter module 101 shown in FIG. 1) makes measurements to determine a center wavelength of the input light produced by the source 201. Compensating signals defining information regarding shifts in the center wavelength associated with the interrogating light spectrum feedback to the source 201 from the filter module 202 through feedback compensating line 220. The feedback compensating line 220 provides a transmission pathway for the compensating signals that can be, for example, electrical or optical signals. Upon receipt of the compensating signals at the source 201, modification of a property that effects the light output by the source 201 compensates for the shift as determined with the filter module 202. For example, temperature control within or around the source 201 can modify the source 201 in order to provide the necessary compensation. For some embodiments having a SFS as the source 201, changing current supplied to a laser used to pump a piece of fiber to fluoresce imparts the compensation desired.

Figure 3:
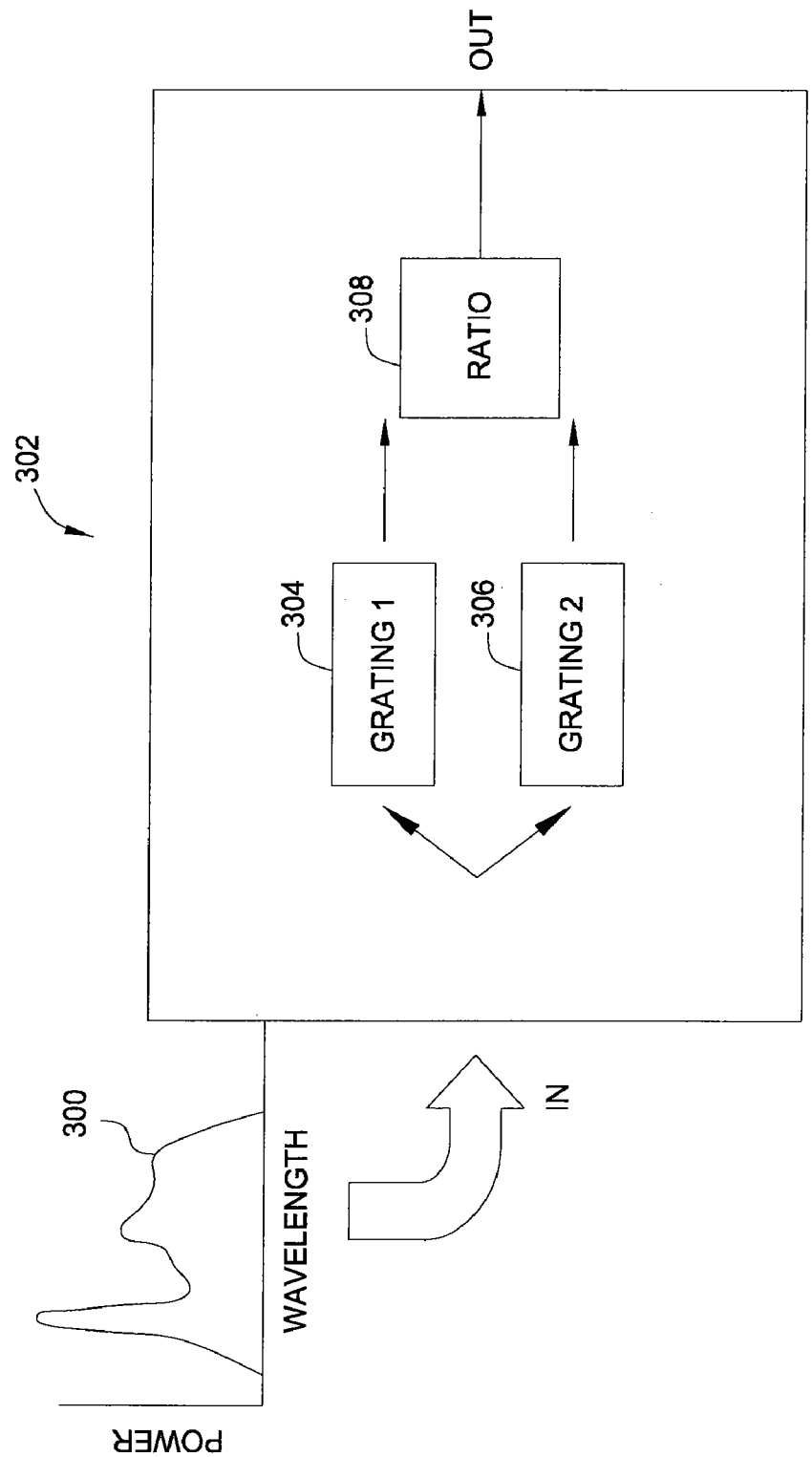
FIG. 3 is a schematic representation of the filter module utilized within optical sensing systems according to embodiments of the invention.

FIG. 3 shows a schematic representation of a filter module 302 utilized within optical sensing systems and applications as described above. Source light 300 enters the filter module 302 where the light 300 interacts with a first grating, such as a first FBG 304, and a second grating, such as a second FBG 306. With reference to FIGS. 4-7 illustrating the first and second gratings 304, 306 with responses centered at $\lambda_1$ and $\lambda_2$, respectively, a signal power measured from the first FBG 304 relative to a signal power measured from the second FBG 306 provides a ratio 308 that is characteristic of and varies in a signature manner as a result of fluctuations, shifts or drifts in the source light 300. While the filter module 300 only shows two of the gratings 304, 306, use of additional gratings can further improve accuracy in determining the shift in the source light 300. Output from the filter module 302 of the ratio 308 and/or the determined shift in the source light 300 enables compensation of either a source or responses at a receiver due to the shift in the source light 300.

FIGS. 4 and 5 illustrate graphs of optical power verses wavelength for source light 400 and response signals 501, 502 reflected at two wavelength bands corresponding respectively with first and second gratings in a filter module. The gratings reflect a narrow bandwidth of light centered at $\lambda_1$ and $\lambda_2$, respectively. The source light 400 defines a broadband spectrum including $\lambda_1$ and $\lambda_2$ and having a center wavelength at $\lambda_{c1}$. Measuring the intensity of response signals 501, 502 enables calculation of a ratio between the intensity of response signals 501, 502, which provides a unique characterization of the source light 400 for determining any drifts.

As an example of this drift, FIG. 6 shows a graph of optical power verses wavelength for a shifted source light 600 with respect to the source light 400 depicted as a dashed line for reference. The shifted source light 600 defines a broadband spectrum having a center wavelength at $\lambda_{c2}$, which has drifted from $\lambda_{c1}$ due to source fluctuations. An arrow labeled "x" identifies the amount (e.g., 1.0 nanometer) of drift between the source lights 400, 600.

FIG. 7 illustrates corresponding response signals 701, 702 reflected in the filter module when the shifted source light 600 (shown in FIG. 6) is input into the filter module. Evaluation of the ratio between the intensity of the corresponding response signals 701, 702 enables determination of the amount of drift "x." This ratio visually perceptible in FIG. 7 provides distinction from, for example, the ratio apparent in FIG. 5, or any other center wavelengths of the input light spectrum.

FIGS. 8 and 9 illustrate graphs of optical power verses wavelength for source light 800 and response signals 801, 802 reflected at two wavelength bands corresponding respectively with first and second gratings in a filter module. The gratings reflect a narrow bandwidth of light centered at $\lambda_1$ and $\lambda_2$, respectively. The source light 800 defines a broadband spectrum including $\lambda_1$ and $\lambda_2$ and having a center wavelength at $\lambda_{c1}$. Measuring the intensity of response signals 801, 802 enables calculation of a ratio between the intensity of response signals 801, 802, which provides a unique characterization of the source light 800 for determining any spectrum changes that may occur in a pre-identified known manner.

As an example of such a change in spectrum, FIG. 10 shows a graph of optical power verses wavelength for a shifted source light 900 with respect to the source light 800 depicted as a dashed line for reference. The shifted source light 900 defines a broadband spectrum having a center wavelength at $\lambda_{c2}$, which has drifted from $\lambda_{c1}$ due to source fluctuations. This drift may occur with known shape changes to the spectrum such that the ratios obtained as described herein can be calibrated to the amount of change.

FIG. 11 illustrates corresponding response signals 901, 902 reflected in the filter module when the shifted source light 900 (shown in FIG. 10) is input into the filter module. Evaluation of the ratio between the intensity of the corresponding response signals 901, 902 enables determination of the amount of drift. This ratio visually perceptible in FIG. 11 provides distinction from, for example, the ratio apparent in FIG. 9, or any other center wavelengths of the input light spectrum due to the characteristic shape changes of the spectrum.

Figure 12:
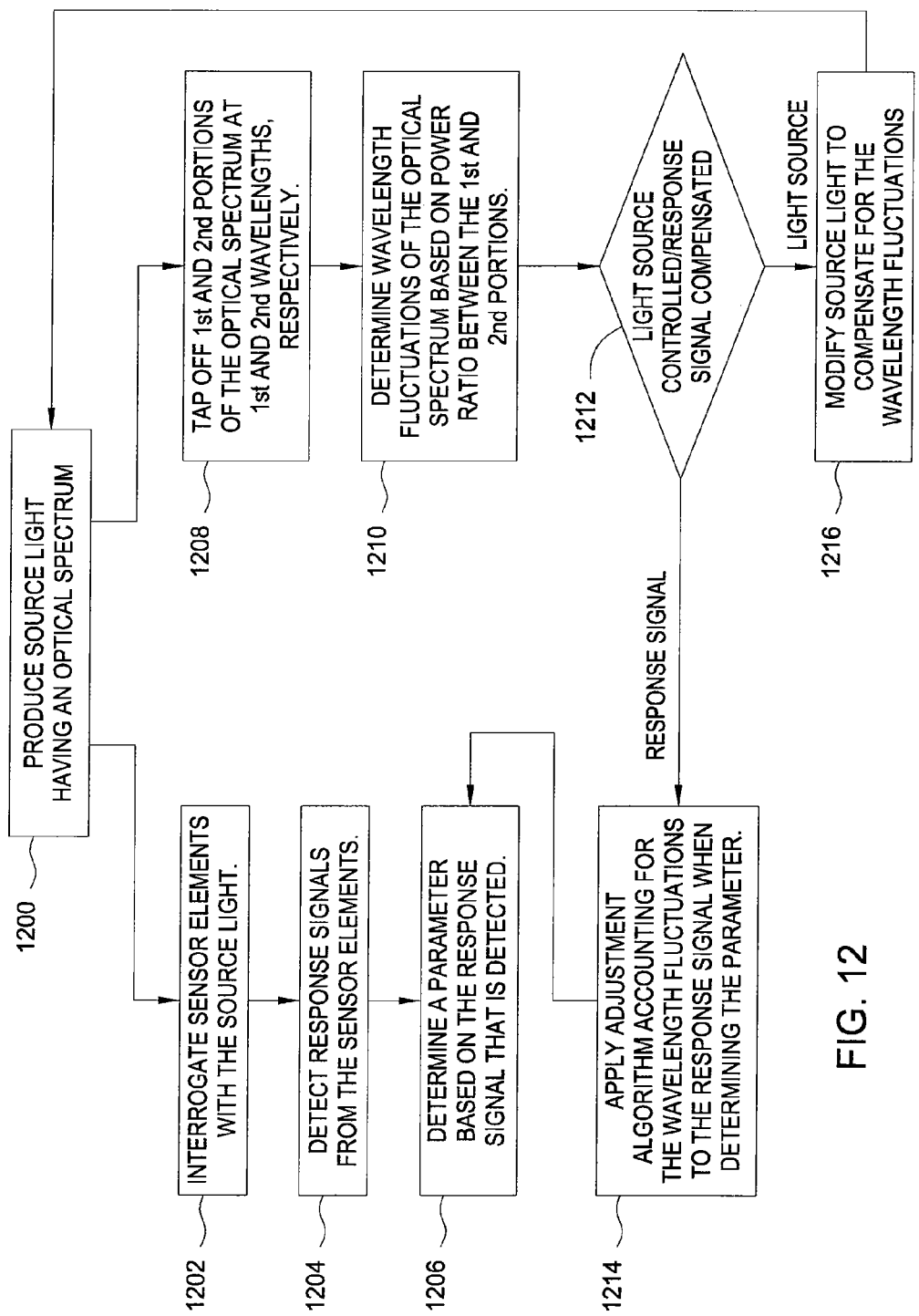
FIG. 12 is a flow diagram of operations for interrogating the optical sensing systems in accordance with embodiments of the invention.

FIG. 12 illustrates a flow diagram of operations for interrogating the optical sensing systems described herein. At initial step 1200, an optical source produces source light having an optical spectrum. This source light travels through optical transmission pathways to interrogate sensor elements at interrogation step 1202. A receiver utilized in detection step 1204 detects response signals from the sensor elements. These response signals feed into an output step 1206 where a parameter is determined based on the response signal that is detected. Determinations of the parameter obtained utilizing techniques as described herein may be output to a user via, for example, a display or printout. Further, these determinations of the parameter may by used to generate a signal or control a device.

Additionally, compensation steps 1208-1216 that can be accomplished utilizing a filter module of the invention improve accuracy and reliability of the parameter determination at the output step 1206. At tap step 1208, filtering produces first and second tapped off portions of the optical spectrum that respectively define different first and second wavelength bands. A power ratio based on intensity measurements of the first and second portions enables determination, at center wavelength determination step 1210, of any shifts in the optical spectrum for the source light.

Configuration block 1212 identifies whether the source light is controlled and/or the response signal is compensated. Some embodiments proceed to either one or both of an adjustment algorithm step 1214 and a source modification step 1216. The source modification step 1216 includes a feedback arrangement to initial step 1200 in order to change a characteristic of the source light, thereby compensating for the wavelength fluctuations. At the adjustment algorithm step, applying an adjustment algorithm when determining the parameter at output step 1206 accounts for effect of the wavelength fluctuations on the response signal detected from the sensor elements.

While the foregoing is directed to embodiments of the present invention, other and further embodiments of the invention may be devised without departing from the basic scope thereof, and the scope thereof is determined by the claims that follow.

What is claimed is:

1. A sensor system, comprising:
a broadband light source for producing an optical spectrum defining interrogating light signals;
a sensor element coupled to the light source and configured to provide response signals from the interrogating light signals;
a receiver coupled to the sensor element and configured to detect and process the response signals;
a filter module in optical isolation from the response signals and having a filtering device that taps off first and second portions of the optical spectrum at, respectively, first and second wavelength bands, wherein control circuitry compares intensity between the first and second portions to determine wavelength fluctuations of the optical spectrum; and
signal processing equipment configured to determine a parameter based on the response signals that are detected, wherein the signal processing equipment accounts for effects on the response signals due to the wavelength fluctuations.

2. The sensor system of claim 1, wherein the sensor element comprises a fiber-optic gyroscope.

3. The sensor system of claim 1, wherein the light source is controlled based on a feedback from the filter module to compensate for the wavelength fluctuations.

4. The sensor system of claim 1, wherein the control circuitry calculates a ratio of a first optical power of the first portion to a second optical power of the second portion in order to determine the wavelength fluctuations.

5. The sensor system of claim 1, wherein the filtering device comprises first and second gratings that reflect respectively the first and second wavelength bands.

6. The sensor system of claim 1, wherein the filtering device comprises first and second fiber Bragg gratings that reflect respectively the first and second wavelength bands.

7. The sensor system of claim 1, wherein the control circuitry determines wavelength fluctuations of the optical spectrum without reliance on any optical parameter other than signal amplitudes to assess the intensity.

8. The sensor system of claim 1, wherein the sensor element comprises a fiber Bragg grating.

9. A method of sensing a parameter, comprising:
   producing a broadband optical spectrum defining interrogating light signals;
   interrogating a sensor element with the interrogating light signals to provide response signals;
   tapping off first and second portions of the optical spectrum without the response signals and at, respectively, first and second wavelength bands;
   comparing intensity between the first and second portions to determine wavelength fluctuations of the optical spectrum;
   compensating for the wavelength fluctuations, wherein compensating for the wavelength fluctuations includes accounting for effects on the response signals due to the wavelength fluctuations;
   detecting and processing the response signals to determine the parameter; and
   outputting determination of the parameter.

10. The method of claim 9, wherein compensating for the wavelength fluctuations includes controlling production of the optical spectrum based on a feedback indicative of the wavelength fluctuations.

11. The method of claim 9, wherein compensating for the wavelength fluctuations includes controlling a temperature of a source that produces the optical spectrum based on a feedback indicative of the wavelength fluctuations.

12. The method of claim 9, wherein compensating for the wavelength fluctuations includes controlling a current supplied to a source that produces the optical spectrum based on a feedback indicative of the wavelength fluctuations.

13. The method of claim 9, wherein first and second gratings reflect the first and second wavelength bands, respectively.

14. The method of claim 9, wherein first and second fiber Bragg gratings reflect the first and second wavelength bands, respectively.

15. The method of claim 9, wherein comparing intensity between the first and second portions to determine wavelength fluctuations of the optical spectrum occurs by measuring signal amplitudes to assess the intensity without reliance on any other optical parameter.

16. The method of claim 9, wherein the response signals comprise reflections of the interrogating light signals from a single fiber Bragg grating.

* * * * *